United States Patent
Rehfuss et al.

(10) Patent No.: US 11,999,288 B2
(45) Date of Patent: Jun. 4, 2024

(54) LIGHT GUIDE AND ILLUMINABLE SCREEN

(71) Applicant: Dr. Ing. h.c. F. Porsche Aktiengesellschaft, Stuttgart (DE)

(72) Inventors: Benjamin Rehfuss, Rutesheim (DE); Max Nitsch, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 18/227,774

(22) Filed: Jul. 28, 2023

(65) Prior Publication Data

US 2024/0034227 A1 Feb. 1, 2024

(30) Foreign Application Priority Data

Aug. 1, 2022 (DE) ...................... 10 2022 119 181.8

(51) Int. Cl.
  *B60Q 3/233* (2017.01)
  *B60Q 3/50* (2017.01)
  *B60Q 3/62* (2017.01)

(52) U.S. Cl.
  CPC ............... *B60Q 3/233* (2017.02); *B60Q 3/50* (2017.02); *B60Q 3/62* (2017.02)

(58) Field of Classification Search
  CPC ............. B60Q 3/233; B60Q 3/50; B60Q 3/62
  See application file for complete search history.

(56) References Cited

U.S. PATENT DOCUMENTS

| | | | | |
|---|---|---|---|---|
| 4,217,628 A | * | 8/1980 | Windom | G09F 13/04 439/13 |
| 6,561,684 B2 | * | 5/2003 | Reitze | B60Q 3/80 315/84 |
| 8,556,319 B2 | | 10/2013 | Petouhoff et al. | |
| 10,520,155 B2 | | 12/2019 | Matsubara et al. | |
| 10,974,644 B2 | | 4/2021 | Severinski et al. | |
| 2012/0014127 A1 | * | 1/2012 | Kanade | G02B 6/0045 362/558 |

FOREIGN PATENT DOCUMENTS

| | | |
|---|---|---|
| DE | 102008021290 | 11/2009 |
| DE | 202012103295 | 11/2012 |
| DE | 102011089575 | 6/2013 |
| DE | 102015008158 | 12/2016 |
| DE | 102016120133 | 4/2018 |
| DE | 102019118005 | 1/2021 |
| DE | 102020115715 | 12/2021 |

\* cited by examiner

*Primary Examiner* — Thomas M Sember
(74) *Attorney, Agent, or Firm* — Gerald E. Hespos; Michael J Porco

(57) ABSTRACT

A light guide (1) is provided for an illuminable screen (2) of a motor vehicle seat (3). The light guide (7) has a pin-shaped light-introducing region (4) and a plate-shaped light-emitting region (5). The pin-shaped light-introducing region (4) transitions into the plate-shaped light-emitting region (5) over an arch region (6) expanding from the pin-shaped light-introducing region (4) to achieve a compact design.

12 Claims, 4 Drawing Sheets

LIGHT GUIDE AND ILLUMINABLE SCREEN

CROSS REFERENCE TO RELATED APPLICATION

This application claims priority on German Patent Application No 10 2022 119 181.8 filed Aug. 1, 2022, the entire disclosure of which is incorporated herein by reference.

BACKGROUND

Field of the Invention. The invention relates to a light guide for an illuminable screen and to a motor vehicle seat having such an illuminable screen.

Related Art U.S. Pat. No. 8,556,319 B2 discloses a motor vehicle seat with an illuminable screen and a cover. The cover has a surface that can also be illuminated from the rear. The surface is treated with a laser so that a graphical element or pattern is introduced.

U.S. Pat. No. 10,974,644 B2 discloses a vehicle seat with a graphical component and a light source that illuminates the graphical component.

DE 10 2020 115 715 A1 discloses a vehicle seat with a cushion body and a cover that has openings. An illumination device is arranged in the vehicle seat, and a side of the cover facing the illumination device can be exposed with light.

DE 10 2015 008 158 A1 discloses an illumination device for generating a suspended illuminated display as staging in a vehicle with an optical element that is illuminated by a light source. The optical element can be configured as a fiber optic having a microstructure display that is invisible in a unlit state of the fiber optic.

DE 20 2012 103 295 U1 discloses a driver or passenger seat of a trailer, camper van, or the like with a back part. An illuminated display device is provided on the front side of the back part and is intended to reproduce a name or logo.

Technical refinements of motor vehicles currently include visual highlights that are intended to improve the overall impression of the motor vehicle and thereby increase its value. Illuminated or rear-illuminated elements/screens are of particular importance to create a particularly comfortable atmosphere.

Rear-illuminated screens/elements of the prior art have been configured to require a comparatively large space and therefore have had only limited use.

An object of the invention is to provide a light guide that reduces a space requirement for an illuminable screen.

SUMMARY OF THE INVENTION

The invention relates to a light guide for an illuminable screen. The light guide is configured so that an illuminable screen equipped with such a light guide has a significantly reduced space requirement, thereby making the illuminable screen an option in locations that previously were not feasible due to space requirements of prior art illuminable screens. The light guide of the invention can be used for an illuminable screen of a motor vehicle seat that has a pin-shaped light-introducing region and a plate-shaped light-emitting region. The pin-shaped light-introducing region is arranged substantially or nearly parallel to the plate-shaped light-emitting region and transitions into the plate-shaped light-emitting region over an arch region expanding from the pin-shaped light-introducing region. The light-introducing region, the arch region, and the light-emitting region thus form a U-shape that provides a particularly compact design in the z-direction. The compact design can be achieved because an LED module need not be arranged on the edge of the light guide to introduce light into the light guide. Rather, the LED module can be placed behind the light guide so that a space requirement in the x direction is increased slightly, but the space requirement in the z-direction is reduced significantly. In particular, the configuration enables an illuminable screen to be arranged, for example, between a backrest and a headrest of a motor vehicle seat. This region has comparatively little design space available in the z-direction (vertical direction) and has made conventional screens in this installation location impossible. However, the substantially U-shaped curved light guide described herein enables an illuminable screen to be provided in this region of the motor vehicle seat, and an optical highlight can be created in this region, which is visually striking for a person entering the motor vehicle. A screen arranged therein can also be used to facilitate locating a motor vehicle in the dark.

In some embodiments, a guide pin is arranged on the pin-shaped light-introducing region of the light guide, and an LED module may be connected to the guide pin. More particularly, the LED module may have a guide contour that enables a simple and precise alignment of the guide pin with the guide contour on the LED module. The guide pin can be formed integrally with the fiber optics and produced together with the light guide as an integral plastic injection molded part.

Some embodiments of the light guide have a wedge-shaped recess on a free edge of the plate-shaped light-emitting region. The wedge-shaped recess allows the corners to be pulled down to achieve a larger, substantially rectangular and highly homogeneously illuminated illumination window in the plate-shaped light-emitting region. Experiments determined that a rectangular configuration of the light-emitting region enables corner areas to remain darker and achieves an overall inhomogeneous illumination of the plate-shaped light-emitting region. The pulling down of the two corners of the plate-shaped light-emitting region results in the wedge-shaped recess on the free edge of the plate-shaped light-emitting region, and achieves a significantly enlarged rectangular illumination window to be available so that illuminable lettering can be created in this space.

The plate-shaped light-emitting region may comprise dopings (imperfections) that cause a light diversion, such as diversions orthogonal to the plate-shaped light-emitting region. These imperfections are introduced into the plate-shaped light-emitting region by heat input by a laser and cause a light reflection or light scattering. These dopings previously have been calculated in corresponding programs and are arranged such that the plate-shaped light-emitting region or an illumination window that is predefined and specified is homogeneously illuminable.

In some embodiments, a number of dopings in the plate-shaped light-emitting region increases in the direction of the wedge-shaped recess, i.e. in the direction of the free edge of the plate-shaped light-emitting region. Increased doping increases the light reflection or the light-emitting effects in the plate-shaped light-emitting region in the direction of the free edge, thereby enabling an overall extremely homogeneous and uniform illumination of the plate-shaped light-emitting region or the illumination window arranged therein. This allows for particularly uniform illumination, for example a lettering, of the illuminable screen.

The arch region of the light guide may comprise a recess, in particular a recess. This recess also results from calculations and causes a particularly uniform light introduction into the plate-shaped light-emitting region. The recess causes a fanning of the light introduced via the pin-shaped light-introducing region onto the width of the plate-shaped light-emitting region. The widening arch region and the recess in the arch region may be configured such that the light introduced into the pin-like light-introducing region is introduced evenly across the width of the plate-shaped light-emitting region therein.

The invention further relates to equipping an illuminable screen for a motor vehicle seat with a light guide as described above. Thus, a very compact screen is provided and enables visual highlights, individualized lettering, patterns, or graphics, to be attached at locations that would otherwise be inaccessible. A comparatively low mounting window between a headrest and a backrest of a motor vehicle seat can be used by the curved light guide.

The illuminable screen disclosed herein comprises a rear-illuminable and at least partially transparent front part as well as a carrier that can be clipped thereto via clip connections. The front part and the rear part define a receiving space in which the plate-shaped light-emitting region of the light guide is received. The clip connection provides a comparatively simple assembly of the two parts as well as a comparatively simple release of the front part from the carrier. The at least partially transparent front part is backlit by the light guide and thereby generates the visually perceptible pattern, graphics or lettering on the vehicle seat.

An LED module, as described herein, is connected to the light guide via a clip connection. Additionally, the guide pin of the light guide cooperates with an associated guide contour on the LED module to achieve a predefined relative position between the light guide and the LED module. As a result, a comparatively simple assembly of the LED module on the light guide is possible, and a complex alignment on the basis of the guide pin and the cooperating guide contour is omitted.

The invention also relates to a method of equipping a motor vehicle seat with an illuminable screen as described herein, thereby using comparatively small construction spaces in a motor vehicle seat that were not accessible previously. The screen described herein also leaves the vehicle seat structurally unchanged and production tools for the production of the vehicle seat can be unchanged independently of whether such a screen is used with the above described light guide. An increase in costs for producing the motor vehicle seat can thereby be avoided.

Further features and advantages of the invention follow from the dependent claims, the drawings, and the accompanying description of the figures in relation to the drawings.

The features mentioned above and those discussed below can be used in the specified combination, in other combinations or on their own, without departing from the scope of the invention. The components described above and referred to below of a higher-level unit, e.g. a device, an apparatus, or an assembly that are designated separately, can constitute separate components of this unit, or integral regions or sections of this unit, even if shown differently in the drawings.

Preferred examples of the invention are set forth in the drawings and will be explained in further detail in the description below, wherein identical reference numbers refer to identical, similar, or functionally identical components.

DETAILED DESCRIPTION

Figure 4:
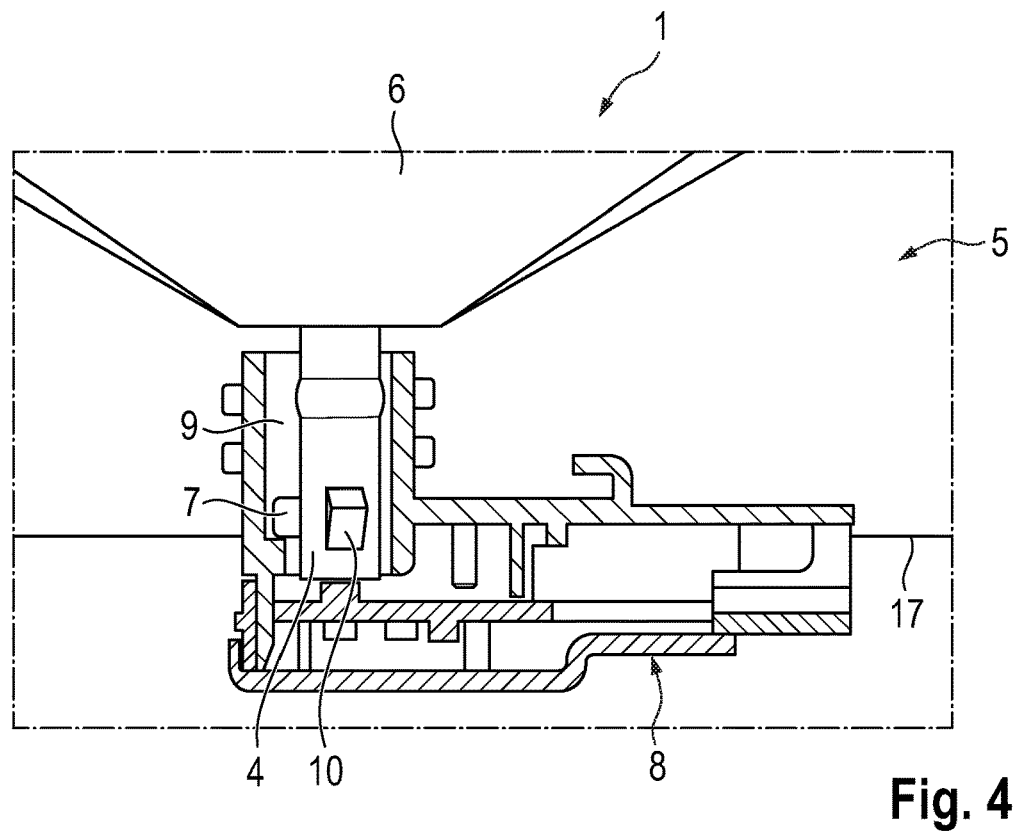
FIG. 4 a view as in FIG. 3, but in a different cutting plane.
Figure 5:
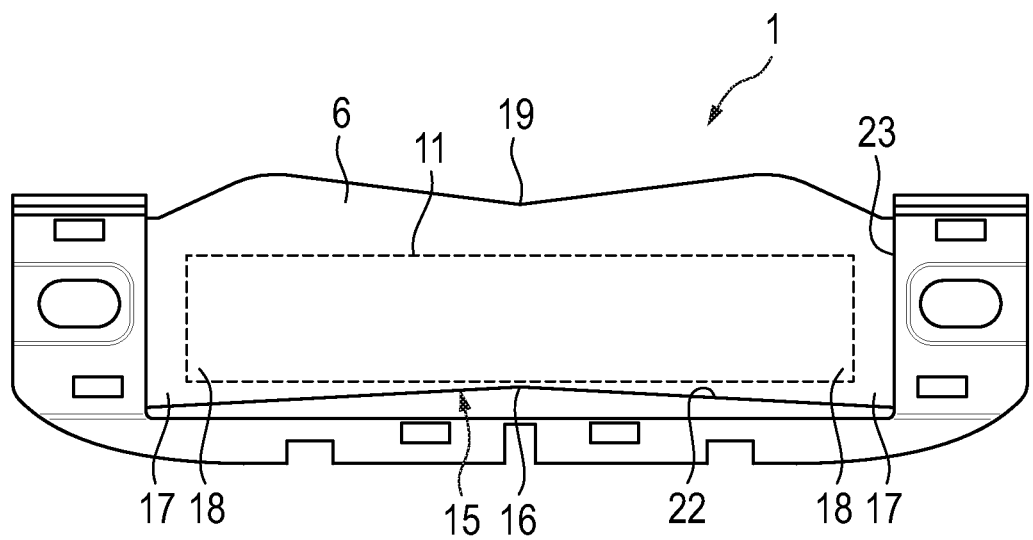
FIG. 5 a view into a recess of a carrier part of the inserted light guide.
Figure 6:
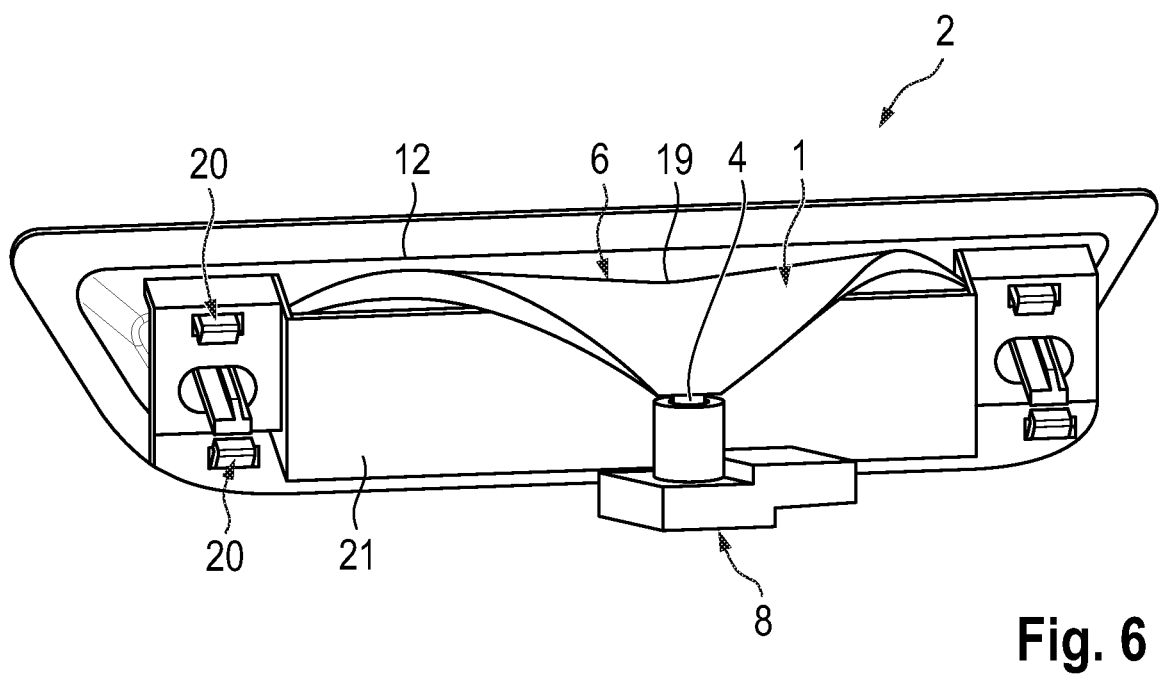
FIG. 6 a rear view onto a screen according to the invention.
Figure 7:
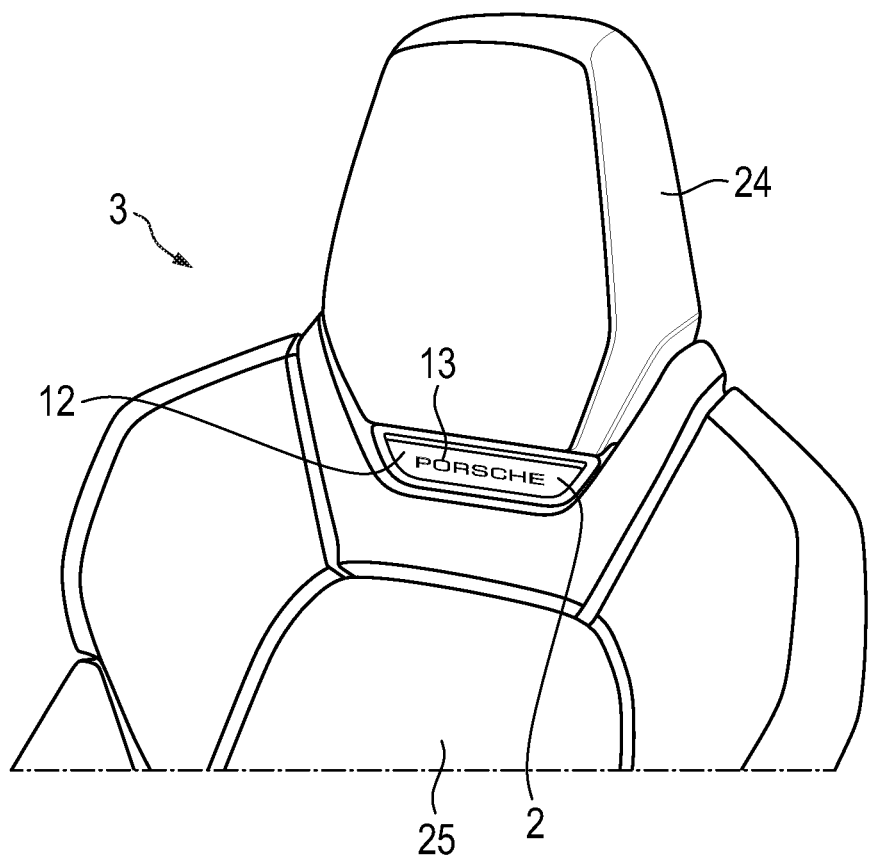
FIG. 7 a motor vehicle seat according to the invention with a screen according to the invention.

A light guide according to an embodiment of the invention is identified by the numeral 1 in FIGS. 1-5 and can be used with an illuminable screen 2, as shown in FIGS. 6 and 7, that can be incorporated into a motor vehicle seat 3, as shown in FIG. 7. The light guide 1 comprises a pin-shaped light-introducing region 4 and a plate-shaped light-emitting region 5. The pin-shaped light-introducing region 4 is nearly parallel to the plate-shaped light-emitting region 5 and is connected thereto via an arch region 6 that expands from the pin-shaped light-introducing region 4. The fan-like widening arch region 6 transitions into the plate-shaped light-emitting region 5.

Figure 2:
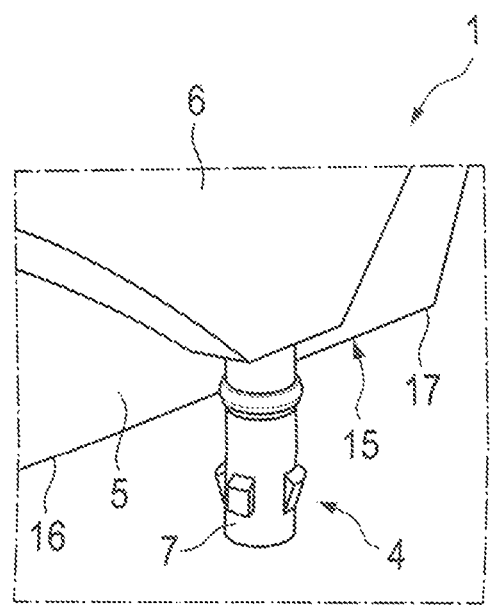
FIG. 2 is a detailed view onto a pin-shaped light-introducing region of the light guide.
Figure 3:
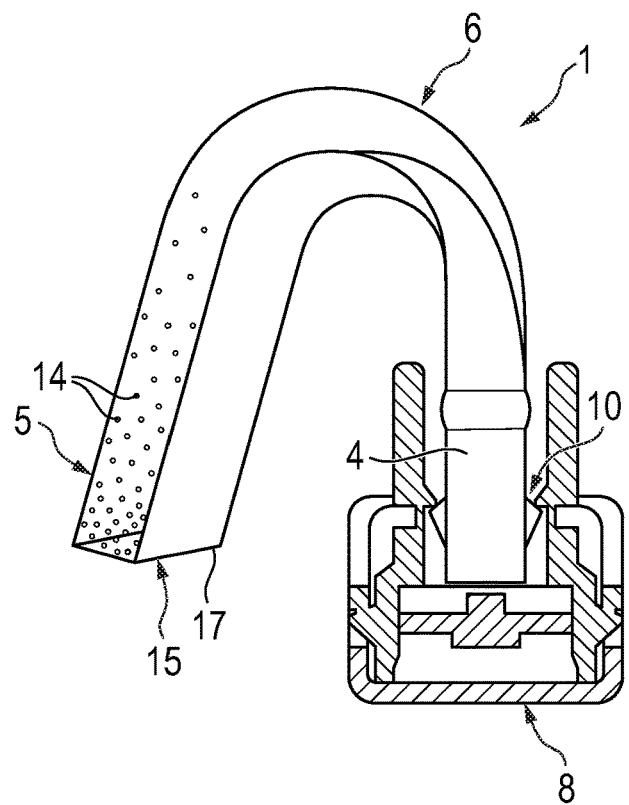
FIG. 3 is a cross-sectional view through the light guide and the LED module.

At least one guide pin 7 is arranged on the pin-shaped light-introducing region 4 of the light guide 1, as shown in FIGS. 2 and 4. The guide pin 7 is integral with the pin-shaped light-introducing region 4 and cooperates with a guide contour 9 arranged on an LED module 8, as shown in FIG. 4, to force a unique relative position of the LED module 8 on both the guide pin 7 and the light guide 1. The guide contour 9 can be configured as a simple groove. A connection between the LED module 8 and the light guide 1 via the pin-shaped light-introducing region 4 can be made via a clip connection 10, as shown in FIG. 3. Thus, a clear relative position and fixation is established between the LED module 8 and the light guide 1.

The LED module 8 can generate monochrome light, multi-colored light or alternatingly colored light that is introduced into the light guide 1 to achieve special optical effects.

The plate-shaped light-emitting region 5 includes an illumination window 11 (dashed line in FIGS. 1 and 5) that is to be illuminated homogeneously with the light guide 1 to illuminate, for example, a lettering 13 (cf. FIG. 7) on a front part 12 of the screen 2. The illumination window 11 is significantly smaller than the plate-shaped light-emitting region 5 of the light guide 1.

The plate-shaped light-emitting region 5 can have internal dopings 14 (imperfections), as shown in FIG. 3, to cause a homogeneous light emission over the light-emitting region 5. These dopings 14 increase towards a free edge 15 of the plate-shaped light-emitting region 5 to cause a stronger reflection or light diversion there than, for example, in the transition from the arch region 6 into the plate-shaped light-emitting region 5, because the light incoming there is significantly stronger.

The light guide 1 has a wedge-shaped recess 16 on the free edge 15 of the plate-shaped light-emitting region 5, such that the two corners 1 in this region 7 are pulled farther down. The wedge-shaped recess 16 or the farther downwardly drawn corners 17 also cause a homogeneous illumination of a corner region 18 of the illumination window 11, which would be inaccessible with a free edge 15 with no wedge-shaped recess 16 or no pulled-down corners 17.

Figure 1:
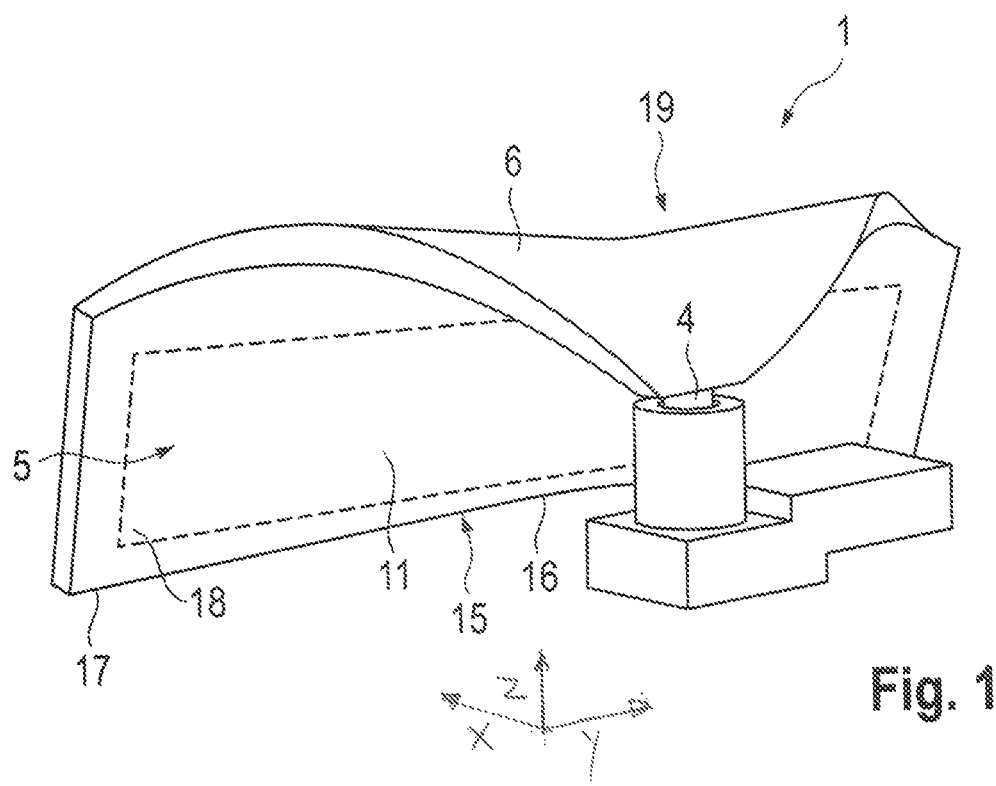
FIG. 1 a perspective view onto a light guide according to the invention with an LED module clipped thereto.

FIGS. 1, 5 and 6 show that the arch region 6 comprises a recess 19, which also helps to evenly distribute the light introduced into the light-introducing region 4 over the light-emitting region 5.

The recess 19 in the arch region 6, the wedge-shaped recess 16 on the free edge 15 and the doping 14 introduced, e.g. by a laser, enables the plate-shaped light-emitting region 5 to produce an extremely homogeneous illumination or light radiation that is sufficient for the lettering 13 of FIG. 7 to be achieved at least in the illumination window 11 of the light-emitting region 5.

The illuminable screen 2 comprises the previously described front part 12, which is at least partially transparent and can comprise, for example, a lettering 13, a graphics, or a pattern that may include an individualized lettering 13. The front part 12 is connected to a carrier part 21 via a clip connection 20, as shown according to FIG. 6. The carrier part 21 has a recess 22 with a circumferential edge 23, as shown in FIGS. 5 and 6. The recess 22, the edge 23, and the front part 12 define a receiving space in which the plate-shaped light-emitting region 5 of the light guide 1 is positively and clearly fixed. An inner side of the recess 22 on the carrier part 21 can be coated with a light-reflective layer to strengthen the illumination effects.

With the light guide 1 and the screen 2 described herein can be incorporated into the motor vehicle seat 3. The screen 2 can be constructed in compact manner so that it can also be used in previously inaccessible spaces, for example between a headrest 24 and a backrest 25 of the motor vehicle seat 3. The optical conductor 1 can be configured as an inexpensive, integral, plastic injection molded part.

The invention claimed is:

1. A light guide (1) for an illuminable screen (2) of a motor vehicle seat (3), the light guide (1) comprising: a pin-shaped light-introducing region (4) extending in a z-direction; an arch region (6) extending from the pin-shaped light-introducing region (4), the arch region (6) expanding in a y-direction transverse to the z-direction and curving back toward the pin-shaped light-introducing region (4); a plate-shaped light-emitting region (5) extending from the arch region (6) and disposed forward of the pin-shaped light-introducing region (4) in an x-direction that is transverse to the z-direction and the y-direction so that the plate-shaped light-emitting region (5), the arch region (6) and the pin-shaped light-introducing region (4) define a substantially U-shape, with a surface of the plate-shaped light-emitting region (5) that faces forward in the x-direction and away from the a pin-shaped light-introducing region (4) defines the illuminable screen (2).

2. The light guide of claim 1, further comprising a free edge (15) at an end of the plate-shaped light-emitting region (5) opposite the arch region (6), a surface of the light guide extending from the free edge (15) back toward the arch region (6) defining the light-emitting region (5), the free edge (15) having opposite corners (17) spaced apart in the y-direction and a wedge-shaped recess (16) between the opposite corners (17).

3. The light guide of claim 2, wherein the plate-shaped light-emitting region (5) comprises dopings (14) that cause a light diversion orthogonally to the plate-shaped light-emitting region (5).

4. The light guide of claim 3, wherein a number of the dopings (14) in the plate-shaped light-emitting region (5) increases towards the wedge-shaped recess (16).

5. The light guide of claim 2, wherein a surface of the arch region (6) facing oppositely from the pin-shaped light-introducing region (4) and the free edge (15) comprises a recess (19).

6. An illuminable screen (2) for a motor vehicle seat (3) comprising the light guide (1) of claim 1.

7. The illuminable screen of claim 6, wherein the illuminable screen (2) comprises a front part (12) and a carrier part (21) that can be clipped to the front part (12) via clip connections (20), the carrier part (21) having a recess (22) surrounded by an at least partially circumferential edge (23), the recess (22), the edge (23) and the front part (12) defining a receiving space in which the plate-shaped light-emitting region (5) is received in an at least partial positive lock, and an LED module (8) connected to the light guide (1) via a clip connection (10), the guide pin (7) of the light guide (1) cooperating with an associated guide contour (9) on the LED module (8), thereby forcing a predefined relative position between the light guide (1) and the LED module (8).

8. A light guide for an illuminable screen (2) of a motor vehicle seat (3), comprising: a pin-shaped light-introducing region (4); an arch region (6) expanding from the pin-shaped light-introducing region (4); a plate-shaped light-emitting region (5) extending from the arch region (6) so that the pin-shaped light-introducing region (4) transitions into the plate-shaped light-emitting region (5) over the arch region (6), and a guide pin (7) arranged on the pin-shaped light-introducing region (4).

9. A motor vehicle seat (3) comprising: a backrest (25) with a forwardly facing surface; and a U-shaped curved light guide (1) having a light-introducing region (4) at a position rearward of the backrest; an arch region (6) extending from the light-introducing region (4) and curving forward over a top of the backrest (25); and a plate-shaped light-emitting region (5) extending from the arch region (6) and disposed adjacent a front surface of the backrest (25), the plate-shaped light-emitting region (5) having an illuminable screen (2) facing forward and away from the backrest (25).

10. The motor vehicle seat of claim 9, wherein the light-introducing region (4) of the light guide (1) is pin-shaped, and a guide pin (7) is arranged on the pin-shaped light-introducing region (4).

11. The motor vehicle seat of claim 9, further comprising a free edge (15) at an end of the plate-shaped light-emitting region (5) opposite the arch region (6), the free edge (15) having opposite corners (17) spaced apart in the y-direction and a wedge-shaped recess (16) between the opposite corners (17).

12. The motor vehicle seat of claim 9, wherein a surface of the arch region (6) facing oppositely from the light-introducing region (4) and the plate-shaped light-emitting region (5) comprises a recess (19).

\* \* \* \* \*